United States Patent [19]

Pequet et al.

[11] Patent Number: 5,436,904
[45] Date of Patent: Jul. 25, 1995

[54] MOBILE COMMUNICATION SYSTEM

[75] Inventors: Eric M. L. M. Pequet, Nalinnes; Serge C. C. Raes, Lodelinsart, both of Belgium

[73] Assignee: Alcatel N.V., Amsterdam, Netherlands

[21] Appl. No.: 103,084

[22] Filed: Aug. 6, 1993

[30] Foreign Application Priority Data

Aug. 11, 1992 [EP] European Pat. Off. ........... 92202482

[51] Int. Cl.$^6$ ............................................... H04J 3/16
[52] U.S. Cl. .................................. 370/95.1; 375/296; 455/23
[58] Field of Search .................... 370/95.1, 95.2, 95.3, 370/20, 104.1; 375/39, 42, 40.41, 46.52, 56.67, 83, 60, 72; 455/23, 54.1, 54.2

[56] References Cited

U.S. PATENT DOCUMENTS

| | | | |
|---|---|---|---|
| 4,686,672 | 8/1987 | Namiki | 370/95.3 |
| 5,081,704 | 1/1992 | Umeda et al. | 370/45.3 |
| 5,274,626 | 12/1993 | Hotta et al. | 370/95.3 |
| 5,278,833 | 1/1994 | Crisler et al. | 370/95.1 |
| 5,283,815 | 2/1994 | Chennakeshu et al. | 375/84 |

FOREIGN PATENT DOCUMENTS 0307962  3/1989  European Pat. Off.
91/00662 1/1991  WIPO.

OTHER PUBLICATIONS

"ECR900 Digital Cellular Mobile Radio System", by M. Ballard, et al, *Electrical Communication*, vol. 63, No. 1, 1989, pp. 45–51.
"Cellular Mobile Radio as an Intelligent Network Application", by M. Ballard, et al, *Electrical Communication*, vol. 63, No. 4, 1989, pp. 389–399.
"Digital Communications–Fundamentals and Applications", by B. Sklar, Prentice–Hall 1988, pp. 484–486 and pp. 710–732.
"Advanced VLSI Components for Digital Cellular Mobile Radio", by M. Rahier, et al., *Electrical Communication*, vol. 63, No. 4, 1989, pp. 409–414.
"Digital Cellular Radio", by G. Calhoun, Artech House 1988, pp. 316–317.
"Digital Communications: Satellite/Early Station Engineering", by K. Feher, Prentice–Hall 1983, p. 199.
"Noncoherent Detection of $\pi/4$-QPSK Systems in a CCI-AWGN Combined Interference Environment", by C. Liu and K. Feher, *Proceedings of the IEEE 40th Vehicular Technology Conference; May 1989*, pp. 83–94.
"Digital Filters: Analysis and Design", by A. Antoniou, McGraw-Hill 1979, pp. 235–244.

*Primary Examiner*—Douglas W. Olms
*Assistant Examiner*—Dang Ton
*Attorney, Agent, or Firm*—Ware, Fressola, Van der Sluys & Adolphson

[57] ABSTRACT

The present mobile communication system includes a base station (BAS) and at least one mobile subscriber station (MOB) having a modulator (COM, SPM, DPEM, QPSKM, KSM) able to modulate a carrier wave with a request for access signal, and a transmitter (A3, DCM, ANTM) to transmit the thus obtained modulated carrier wave to the base station (BAS) during a time slot of a time division multiple access structure (TDS). The modulator is a linear digital modulator (COM, SPM, DPEM, QPSKM, KSM) which, prior to modulating the carrier wave with the request for access signal, modulates a pre-access carrier wave in such a way that a substantially constant envelope output signal is obtained during a subslot (SS1/SS6) of a time slot (SI). In a further embodiment the mobile subscriber stations are arranged in groups, to which distinct groups of time slots of said time division multiple access structure (TDS) are assigned, and each of the mobile subscriber stations (MOB) is allowed to launch a request for access in a time slot of the assigned group only.

15 Claims, 2 Drawing Sheets

MOBILE COMMUNICATION SYSTEM

TECHNICAL FIELD

The present invention relates to a mobile communication system with a base station and at least one mobile subscriber station including modulation means able to modulate a carrier wave with a request for access signal, and transmission means to transmit the thus obtained modulated carrier wave to said base station during a time slot of a time division multiple access structure.

BACKGROUND OF THE INVENTION

Such a mobile communication system is already known in the art, e.g. from the articles "ECR900 Digital Cellular Mobile Radio System" by M. Ballard and D. Verhulst, Electrical Communication, Vol. 63, No. 1, 1989, pp. 45–51, and "Cellular Mobile Radio as an Intelligent Network Application" by M. Ballard, E. Issenmann and M. Sanchez, Electrical Communication, Vol. 63, No. 4, 1989, pp. 389–399. The time division multiple access (TDMA) structure used in this system is well known in the art and described e.g. in the book "Digital Communications—fundamentals and applications" by B. Sklar, published by Prentice-Hall International Editions, 1988, pp. 484–486. After the transmission of the above request for access or service request, an authentication procedure is started to prevent fraudulent call attempts or listening-in by third parties. Such an authentication procedure is described e.g. in the second mentioned article. After authentication the base station assigns to the mobile station a traffic channel via which further communication can take place.

The above known system uses a constant envelope modulation technique, viz. Gaussian Minimum-shift-keying (GMSK) as explained in the article "Advanced VLSI Components for Digital Cellular Mobile Radio" by M. Rahier, D. Rabaey and J. Dulongpont, Electrical Communication, Vol. 63, No. 4, 1989, p. 410. A drawback of such a constant envelope modulation scheme is that it does not provide an optimal spectral efficiency, in contrast with a so-called linear modulation scheme, as is explained for example in the book "Digital cellular radio" by G. Calhoun, published by Artech House, Inc., 1988, p. 317. On the other hand, a drawback of a linear modulation scheme is that it provides signals with a non-constant envelope and which, to avoid spreading of the transmission spectrum, should only be amplified by linear amplifiers, as argued e.g. in the book "Digital Communications: satellite/earth station engineering" by K. Feher, published by Prentice-Hall Inc., 1983, p. 199. Although amplifiers used for amplifying constant envelope modulated signals theoretically do not have to operate in a linear way, in practice the envelope of the latter signals is not a constant so that some linearity is required.

If two (or more) mobile subscriber stations transmit requests for access which are modulated in the same access channel, i.e. on a same access carrier wave, and within the same time slot, collision occurs. Due to the superposition of these requests the base station cannot distinguish between the requesting subscriber stations, but detects the collision. The base station then launches a so-called negative acknowledgement to the colliding mobile subscriber stations indicating their request for access has not been received in good order, and so giving rise to the launching of another request for access by the mobile subscriber stations. Although the chance for a new collision is small since this second request for access occurs after a random delay, the setting up of a communication can be strongly delayed, especially under heavy traffic conditions, i.e. the more mobile subscriber stations want to set up a communication per unit of time, the longer the average delay becomes. Since collision can only occur when two or more subscribers request access to the base station within a same time slot, reducing the time slot length reduces the probability for collision. However, several factors require a minimum time slot length. Firstly, as explained above, the amplifiers amplifying modulated signals need some time, called ramp up time, to enable them to operate in a linear way and without giving rise to a large spectrum of noise. Secondly, and for the same reason, they also need some time, called ramp down time, to be gradually cut off. Finally, a small so-called guard time is also needed to prevent interference between adjacent time slots due to differences in time delay between different subscriber stations and the base station. However, the guard time can be very small, depending on the distances between the different subscribers and the base station, i.e. depending on the area covered by the base station.

From the above it follows that a lower limit for the time slot length is required mainly because of ramp up and ramp down times. Moreover, since within these times no useful information is communicated, i.e. since these times are to be considered as idle times, they decrease the information rate of the communication. Therefore and because these times do not depend on the time slot length a minimum required information rate imposes a further constraint for minimizing the time slot length.

DISCLOSURE OF INVENTION

An object of the present invention is therefore to provide a mobile communication system of the above type but with an improved spectral efficiency and a reduced possibility for collision.

This object is achieved due to the fact that said modulation means is a linear digital modulation means which, prior to modulating said carrier wave with said request for access signal, modulates a pre-access carrier wave in such a way that a substantially constant envelope output signal is obtained during a subslot of a said time slot.

As explained above, using a linear modulation means provides a better spectral efficiency than a constant envelope modulator. On the other hand, since the subslots are smaller than a time slot, the probability for collision, i.e. the probability that two (or more) subscribers transmit the substantially constant envelope signal within the same subslot and on the same pre-access carrier wave, also becomes much smaller. E.g. n subslots each occupying one nth of a time slot cause the probability to decrease by a factor n. Moreover, as already explained above, due to the fact that a substantially constant envelope output signal is used, amplifiers amplifying these signals do not require a strictly linear operation as for linearly modulated signals, thus allowing a decrease of the length of the above mentioned ramp up and ramp down times and subslots.

It is to be noted that the above technique of using subslots is similar to a technique already described in the PCT patent application PCT/EP89/00728 with publication number WO 91/00662. In the communication system disclosed therein a substation wanting to transmit data first selects a free signalling channel by putting a corresponding bit of a communication cell on one and the main station receiving the one, transmits a message in a communication cell indicating that the substation having put said corresponding bit to one may now transmit its address. However, this system is not a mobile communication system but a fixed one and is connected in such a way that the delay for a message transmitted by the main station to a substation and looped back to the main station is constant, so that the main station and the substations are perfectly synchronized. In a mobile communication system this delay is not a constant and might in fact be continually changing. Thus in the fixed system two adjacent bits set to one by two different substations are perfectly distinguishable by the main station. In a mobile system this would not be the case since two adjacent bits transmitted by different subscribers could overlap or be no longer adjacent when received by the base station. Consequently, the information of the bits would no longer be detectable.

To be noted also that the problem of spectral efficiency is less important in a fixed than in a mobile communication system.

A further characteristic feature of the invention is that said modulation means modulates said pre-access carrier wave during said subslot with a periodic bitstream and then filters the thus obtained modulated pre-access carrier wave so as to obtain a substantially pure sinusoidal signal constituting said substantially constant envelope signal.

By modulating the pre-access carrier wave with the periodic bitstream during the information interval of a subslot a signal with a substantially discrete, i.e. strongly peaked, frequency spectrum is obtained. By filtering out one of these peaks with the filter the substantially pure sinusoidal signal with a substantially constant envelope is obtained.

In a preferred embodiment for the invention, said base station includes means for detecting, upon reception of said signal, within which subslot said output signal is transmitted, and said means for detecting said subslot also detects the frequency of said substantially pure sinusoidal signal.

In this way, the mobile subscriber station is identified by the chosen subslot and by the frequency of the substantially pure sinusoidal signal. The probability for collision is thus further reduced. Indeed, when the substantially pure sinusoidal signal is chosen as one of m signals each with a different frequency, this probability is reduced by a factor m since the base station is able to distinguish between different mobile subscriber stations launching different ones of these signals within the same subslot.

In another embodiment of the invention said time slot includes at least one subslot via which a linearly modulated signal with a non-constant envelope may be transmitted, and at least one subslot via which a said substantially constant envelope signal may be transmitted.

Such an embodiment allows for a same frequency channel to be used by one mobile subscriber station launching a substantially constant envelope output signal and by another mobile subscriber station launching a request for access or other data. For that purpose a protocol must be made agreeing on such a slot structure.

A further characteristic feature of the invention is that said frequency corresponds to control information.

In this way each frequency may represent a different message or control code.

A still further characteristic feature of the present mobile communication system is that said mobile subscriber stations are arranged in groups to which distinct groups of time slots of said time division multiple access structure are assigned, and that each of said mobile subscriber stations is able to launch a said request for access in a time slot of the assigned group only.

In this way the probability for collision is further reduced since in each time slot only part of the mobile subscriber stations is allowed to launch a request for access. The penalty is merely a slightly increased communication set up time compared to the prior art, since a mobile subscriber station wanting to launch such a request for access has to wait for a time slot of the group assigned to it to do so.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
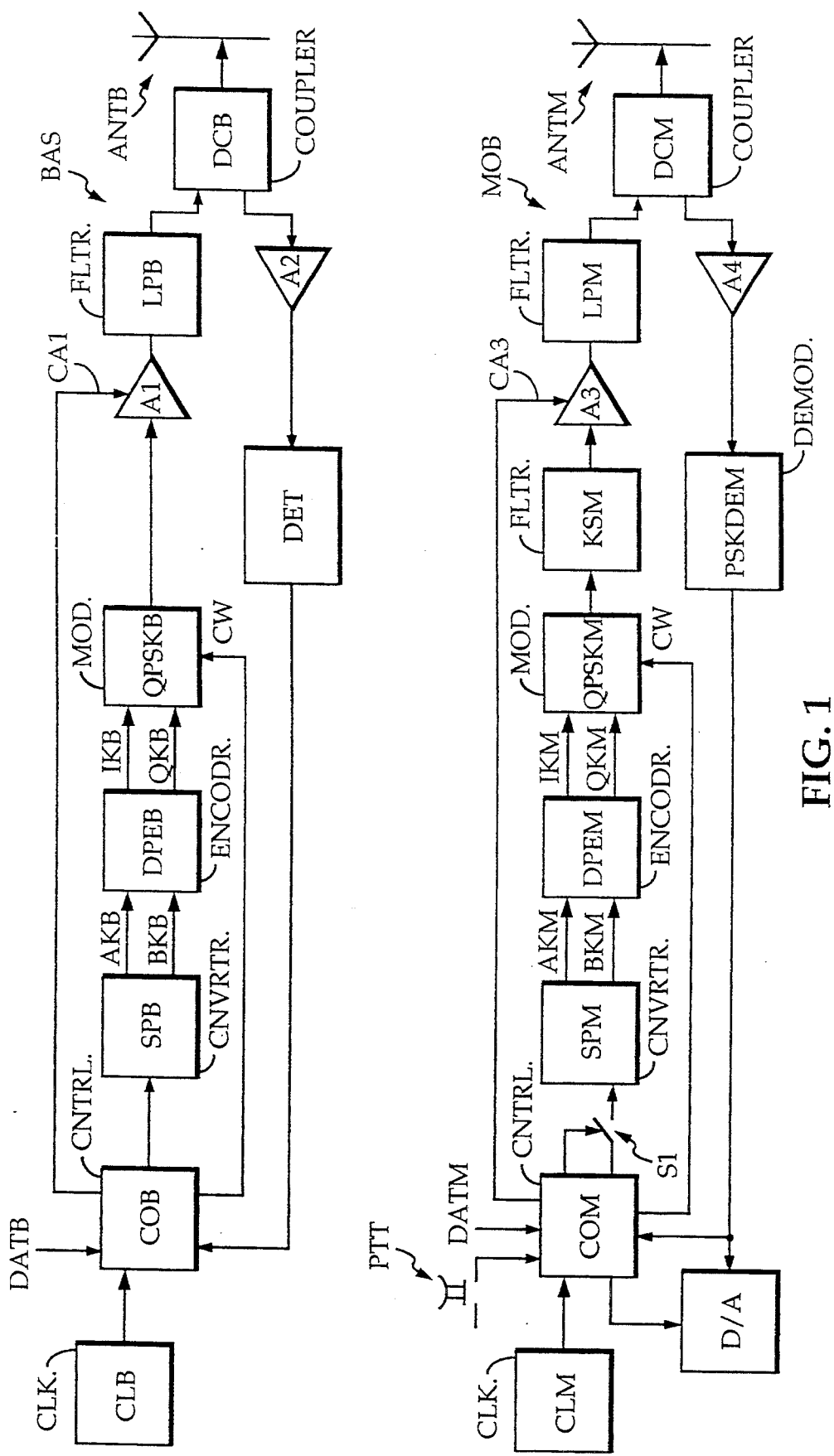
FIG. 1 shows a mobile communication system according to the invention.

The mobile communication system represented in FIG. 1 includes a base station BAS and a plurality of mobile subscriber stations of which only one, MOB, is shown. BAS and MOB are controlled by respective synchronized clocks CLB and CLM which are used for realizing a time division multiple access structure TDS shown in FIG. 2. The latter structure TDS allows digital binary data to be exchanged between the base station BAS and the mobile station MOB and is constituted by successive time slots which are arranged in (not shown) frames and multiframes. For example, for a time slot length of 14.16 msec and a bitrate of the binary data of 36 kbits per second, each time slot can contain 510 data bits. So far, TDS is equivalent to a usual time division multiple access (TDMA) structure such as the one described e.g. in the already mentioned book by B. Sklar.

However, for the purpose of setting up a digital data communication to be described later, each time slot, e.g. SI, is subdivided in 6 subslots SS1 to SS6, each of which contains three intervals: a ramp up first interval RU, an information second interval INF and a ramp down and guard third interval RDG.

Returning to FIG. 1, the base station BAS includes a control circuit COB which is controlled by the above clock CLB applied at one of its inputs and provides digital data to be transmitted in the correct time slot and a carrier wave CW with the frequency fc of a channel wherein the digital data is to be transmitted. The control circuit COB receives data either from a data input DATB or from a detector DET an input of which is connected to the output of an amplifier A2. An antenna ANTB is connected to an input of amplifier A2 via a directional coupler DCB. The digital data provided by the control circuit COB is applied to a series-to-parallel convertor SPB converting the serially applied digital binary data to two bit parallel binary data AKB and BKB. The latter data AKB and BKB are then applied to a differential phase encoder DPEB which in response supplies differential phase input signals IKB and QKB to a $\pi/4$ shifted quadrature phase shift keying ($\pi/4$ QPSK) modulator QPSKB to which also the carrier wave CW is applied. The combination of DPEB and QPSKB constitutes a $\pi/4$ differential QPSK ($\pi/4$ DQPSK) modulator. An output of QPSKB is connected to an input of amplifier A1 having also a control input CA1 controlled by COB. An output of A1 is connected to an input of a low pass filter LPB, an output of which is connected to the antenna ANTB via the directional coupler DCB.

To be noted that the $\pi/4$ DQPSK modulator constitutes a linear modulation means and thus guarantees a good spectral efficiency, but requires amplifier A1 to operate in a linear way when transmitting digital binary data to avoid adjacent channel interference.

The mobile subscriber station MOB is built up in a similar way as the base station BAS. It includes a control circuit COM with a data input DATM, a series-to-parallel convertor SPM providing a two-bit parallel data stream AKM and BKM, a differential phase encoder DPEM providing differential phase input signals IKM and QKM, a $\pi/4$ QPSK modulator QPSKM with an input for a carrier wave CW, an amplifier A3 with a control input CA3, a low pass filter LPM, a directional coupler DCM, an antenna ANTM, and an amplifier A4 connected to a $\pi/4$ DQPSK demodulator PSKDEM, all interconnected as in the base station BAS. To be noted that PSKDEM corresponds to the detector DET of the base station BAS. A Kaiser window filter KSM is mounted between QPSKM and A3. The control circuit COM controls a switch S1 mounted between the data output of COM and the input of SPM. The purpose of S1 will become clear later. COM also controls a digital-to-analog convertor DA converting digital data at the output of PSKDEM to an analog signal when the latter data contains non-control information, e.g. speech. The latter analog signal is then e.g. amplified by a (not shown) amplifier and applied to a (not shown) loudspeaker when representing speech. Finally, an input of COM is connected to a push-to-talk button PTT.

Figure 2:
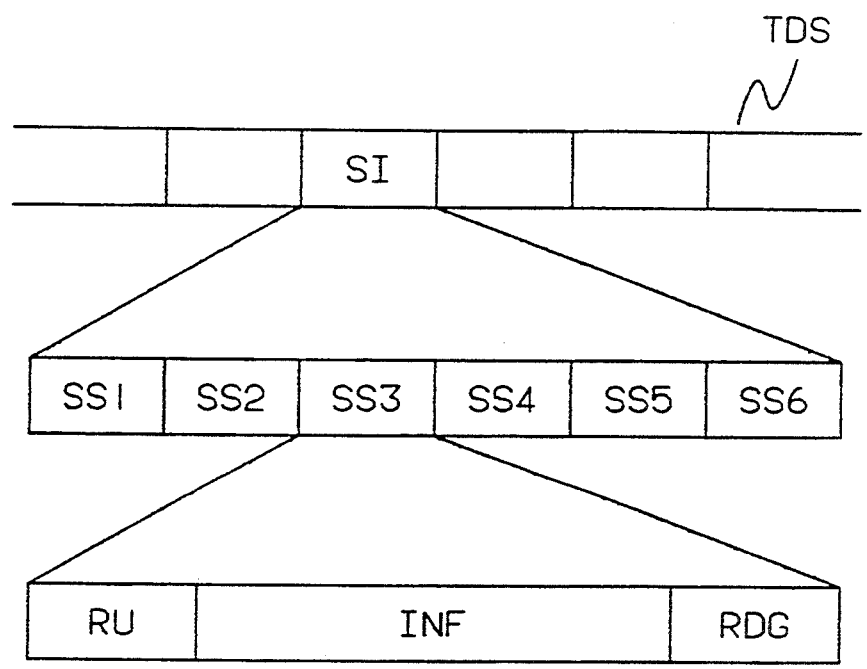
FIG. 2 represents a time division structure used in the mobile communication system of FIG. 1.

Referring to both FIGS. 1 and 2, it will now be described how the mobile subscriber station MOB makes clear his intention to set up a communication allowing digital data to be exchanged with the base station BAS.

As known in the art, e.g. from the already mentioned article by M. Ballard, E. Issenmann and M. Sanchez, such a setting up may involve the execution of a plurality of authentication and assign procedures in order to rule out fraudulent use and listening-in. But before these procedures can be carried out, the mobile subscriber station MOB has to make clear its intention to set up the communication. This is the actual subject of the invention.

When the push-to-talk button PTT is operated the mobile subscriber station MOB makes clear its intention to set up a communication as mentioned above. For that purpose the control circuit COM, which can be implemented as a finite state machine, chooses randomly one, e.g. SS3, of the six subslots SS1 to SS6 of a time slot SI of the above described time division structure TDS, and also randomly selects from a small memory included in COM one of six predetermined bitsequences of four bits represented in the first column of the following table. COM applies the selected bitsequences repeatedly to SPM which in response applies the first and third bits to DPEM as AKM-bits and the second and fourth bits as BKM-bits. Each combination of an AKM-bit and a BKM-bit applied to DPEM gives rise to a unique phase change, viz.: 00 corresponds to a phase change of $-3\pi/4$, 10 to $-\pi/4$, 11 to $\pi/4$, and 01 to $+3\pi/4$. Hence, each bitsequence applied to DPEM produces two consecutive phase changes as indicated in the second column of the table and an average phase change as indicated in the third column of the table. For the above bitrate of 36 kbits per second, the rate of the bitsequences is 9000 per second. As a phase change per unit of time is equivalent to a frequency change, each bitsequence produces a frequency change shown in the fourth column of the table. It is to be noted however that instead of applying the bitsequences shown in the table the signals IKM and QKM may be generated in a different way provided the periodical phase changes are respected. In that case a phase change of $\pi/2$ might be implemented directly instead of via two consecutive phase changes of $\pi/4$ and $3\pi/4$ as shown in the table. This would provide a signal with a greater spectral purity, i.e. avoiding side lobes at 2250 Hz and 6750 Hz, and may cause the Kaiser window filter KSM to be no longer necessary.

| Bitsequence | Phase changes | mean phase | Frequency change |
|---|---|---|---|
| 0000 | $-3\pi/4$; $-3\pi/4$ | $3\pi/4$ | $-6750$ Hz |
| 0010 | $-3\pi/4$; $-\pi/4$ | $\pi/2$ | $-4500$ Hz |
| 1010 | $-\pi/4$; $-\pi/4$ | $\pi/4$ | $-2250$ Hz |
| 1111 | $\pi/4$; $\pi/4$ | $\pi/4$ | 2250 Hz |
| 1101 | $\pi/4$; $3\pi/4$ | $\pi/2$ | 4500 Hz |
| 0101 | $3\pi/4$; $3\pi/4$ | $3\pi/4$ | 6750 Hz |

At the beginning of the chosen subslot the control circuit COM first starts up amplifier A3 via the control input CA3 thereof and closes switch S1. Then, after the ramp up interval RU of the chosen subslot has elapsed, the chosen bitsequence, e.g. 1101, is, via switch S1, repeatedly applied to the series-to-parallel convertor SPM. The parallel bitsequence appearing at the output of SPM is applied to the differential phase encoder DPEM whose outputs are the in-phase and quadrature components IKM and QKM, respectively, which are used for modulating the carrier wave CW in the modulator QPSKM. The carrier wave CW defines a predetermined channel used for setting up the communication.

A description of the operation of a $\pi/4$ QPSK modulator may be found e.g. in the article "Noncoherent detection of $\pi/4$-QPSK systems in a CCI-AWGN combined interference environment" by C. Liu and K. Feher, in the Proceedings of the IEEE 40th Vehicular Technology Conference, May 1989, pp. 83–94.

The output signal of the modulator QPSKM is constituted by the carrier wave CW whose frequency fc is periodically, viz. 9000 times per second, shifted over $\pi/4$, corresponding to part 11 of the bitsequence, and over $3\pi/4$, corresponding to part 01 of the bitsequence 1101. These phase changes give rise to a frequency change of $9000 \times (\pi/4 + 3\pi/4)/2\pi = 4500$ Hz, thus giving a signal with an almost discrete frequency spectrum having a main peak at the frequency fc of the carrier wave CW plus 4500 Hz. The modulated carrier wave then passes through a Kaiser window filter KSM letting virtually only the latter frequency, fc +4500 Hz, pass. The design of such a Kaiser window filter is described e.g. in the book "Digital filters: analysis and design" by A. Antoniou, published by McGraw-Hill Book Company, 1979, pp. 235-244. The spectrum mentioned above can be calculated using Fourier techniques generally known in the art and e.g. described in the book by B. Sklar mentioned above, on pp. 710-732.

As the strongly bandwidth-limited output signal of the Kaiser window filter KSM is a substantially pure sinusoidal signal it has a substantially constant envelope. In contrast therewith, a carrier wave which is linearly modulated with a non-periodic bitsequence has a much flatter frequency spectrum, and when bandwidth-limited in the Kaiser window filter KSM provides a non-constant-envelope signal. Hence, for such non-periodic bitsequences the linearity requirements for amplifier A3 would be much stricter, and therefore ramp up times would be much larger.

It is to be noted that ramp up and ramp down, i.e. starting up and cutting off of the amplifier has to be done within the same subslot, since the amplifier can only be made to work linearly when in operation and since the ramp up and ramp down intervals of one subslot may not influence other subslots. Typically, the ramp up interval RU has a length of 21 bits, i.e. 0.583 msec, whereas for the above mentioned non-periodic bitsequence a ramp up interval of typically up to 4 to 5 msec would be required. The ramp down and guard interval RDG has a length of 16 bits, i.e. 0.444 msec, and the information part INF has a length of 48 bits, i.e. 1.333 msec, thus providing a total subslot length of 85 bits or 2.361 msec, which is one sixth of the time slot length of 14.16 msec.

The substantially sinusoidal signal at the output of KSM is applied to the amplifier A3 and then to the low pass filter LPM the purpose of which is to reduce and cut out harmonics of the substantially sinusoidal signal introduced by A3. The output power of A3 is then transmitted to the base station BAS via the directional coupler DCM preventing this output power to flow to the input of A4, and the antenna ANTM.

After the information interval INF has elapsed, COM gradually cuts off A3 during the ramp down and guard interval RDG of the chosen subslot and after RDG has elapsed S1 is opened again.

When the signal transmitted by the mobile subscriber station MOB is received by the base station BAS, it is picked up by the antenna ANTB and led via directional coupler DCB to amplifier A2. After amplification by A2 the signal is applied to detector DET. DET detects both the frequency of the signal and the subslot within which it is transmitted. This information is applied to the control circuit COB which generates a message to be transmitted back to the mobile subscriber station MOB in a second predetermined channel. This message is a bitsequence confined to a time slot and including a code indicating the subslot and the frequency of the received signal and requesting the mobile subscriber station MOB to transmit his request for access in an access channel also indicated by the bitsequence, and to subsequently settle the above mentioned authentication and assign procedures. This bitsequence is then, in a similar way as described above for the mobile subscriber station MOB, processed by SPB, DPEB, QPSKB, amplified by A1, filtered by LPM, and via DCB applied to ANTB via which it is transmitted. The latter signal is then picked up by the antenna ANTM of the mobile subscriber stations MOB, applied to A4 via DCM and then demodulated by PSKDEM. The resulting signal of this demodulation operation is applied to control circuit COM which detects it as control information and thus prevents it from being processed by the digital-to-analog convertor DA. COM also interprets the information and switches the carrier wave CW to the frequency of the communicated access channel. From this point onward the setting up of the communication goes further with the authentication and assign procedures mentioned above.

In the above described embodiment one (or more) frequency channels are agreed on via which each mobile subscriber station can make clear its intention to launch a request for access to the base station, whereas one (or more) other frequency channels are agreed on which the base station may assign to the mobile subscriber station for launching its request for access and for launching data and control information. In another embodiment a same access/data frequency channel may be agreed on via which the mobile subscriber station may make clear its intention to launch a request for access or launch data or control information. For that purpose a time slot structure is agreed on having one or several subslots in which digital binary data linearly modulated on an access/data carrier wave is launched, and a predetermined number of other subslots in which a substantially pure sinusoidal signal can be launched. The substantially pure sinusoidal signal being used to make clear the intention to launch a request for access, one mobile subscriber station will not launch both types of signals within the same time slot since both types of signals are used in different stadiums of the communication. The subslot for the digital binary data requires a complete ramp up time for linearisation which, as mentioned above is typically up to 4 to 5 msec. An example of such a time slot structure has a digital binary data subslot of 340 bits or 9.444 msec of which 144 bits or 4 msec represent a ramp up interval, and two subslots for the substantially pure sinusoidal signal of each 85 bits or 2.361 msec, which gives a total of 14.16 msec. Instead of using the sinusoidal signal subslot to make clear its intention to launch a request for access, it may also be used to launch service related messages or coded data. In this case each of the frequency changes shown in the above table corresponds to such a service related message or coded data, e.g. an acknowledge signal for data previously received from the base station or a busy signal indicating the mobile subscriber station currently cannot accept information.

The embodiment as described until here presents a mobile communication system in which each mobile subscriber station is allowed to launch a request for access to a base station in whatever available time slot.

To further reduce the probability of collision, in another embodiment the mobile subscriber stations are arranged in groups, each including a substantially like number of mobile subscriber stations, and to each of these n groups of stations one of n distinct groups of time slots is assigned. E.g. the number of mobile subscriber stations belonging to each group is equal to the integer part of one nth of the total number of mobile subscriber stations incremented by one or not. When n equals 10 and a total number of 136 subscribers is registered, there are 6 groups of 14 subscribers and 4 groups of 13 subscribers.

The group to which a mobile subscriber station belongs may be assigned thereto at registration by the base station. This can be done by assigning a specific class number identifying the group. Another possibility is to calculate such a class number locally from the address or another number identifying the mobile subscriber station. It is to be noted that in this case the distribution of the mobile subscriber stations over the groups depends on the addresses or the identifying numbers. One can for example choose the last n digits of the address as the class number thereby providing two to the power of n classes. Another possibility is to calculate from the address a kind of cyclic code, modulo m, in which case m is the number of classes. Such a cyclic code can easily be implemented and is e.g. described in the above mentioned book by B. Sklar, pp. 288–298.

The groups of time slots are constituted by each of the n interleaved and staggered sequences of equidistant time slots each of which is composed of every nth time slot of the structure and which collectively constitute the above mentioned TDMA structure.

In a practical embodiment the mobile communication system has two modes of operation. A first mode is used under low traffic conditions and allows each mobile subscriber station to make clear its intention to set up a communication in each time slot of the TDMA structure. This mode of operation is the mode known and used in the art. When traffic conditions become heavy a second mode of operation is used. This second mode of operation allows the mobile subscriber stations to make clear its intention to set up a communication only in a time slot of the sequence assigned to the group it belongs to. When the base station switches to this second mode of operation, it notifies the mobile subscriber stations thereof with a message modulated on a control carrier wave. The mobile subscriber stations wanting to launch a request for access then have to wait for an allowed time slot before doing so. Since in each time slot only about one nth of the total number of mobile subscriber stations is allowed to launch a request for access, it is clear that the probability for collision is reduced by approximately a factor n. On the other hand a mobile subscriber station must wait on the average approximately $\pi/2$ time slots before being allowed to launch a request for access, in contrast with the prior art where a mobile subscriber station must wait on the average only half a time slot. However, since setting up a communication involves more than only launching the request for access, as is clear from the already mentioned article by M. Ballard, E. Issenmann and M. Sanchez, this additional time delay is negligible compared to the total communication set up time, unlike the additional time delay which arises when the request for access has to be retransmitted after collision has occurred.

While the principles of the invention have been described above in connection with specific apparatus, it is to be clearly understood that this description is made only by way of example and not as a limitation on the scope of the invention.

We claim:

1. Mobile communication system with a base station and at least one mobile subscriber station including modulation means for modulating a carrier wave with a request for access signal for providing a modulated carrier wave, and transmission means for transmitting the modulated carrier wave to said base station during a time slot period of a synchronized time division multiple access time structure known at the base station and the mobile subscriber station, wherein said modulation means is a linear digital modulation means which, prior to modulating said carrier wave with said request for access signal, modulates a pre-access carder wave in such a way that a substantially constant envelope output signal is obtained during a time subslot period of said time slot period.

2. Mobile communication system according to claim 1, wherein said modulation means modulates said pre-access carrier wave during said time subslot period with a periodic bitstream for providing a modulated pre-access carrier wave and then filters the modulated pre-access carrier wave so as to obtain a substantially pure sinusoidal signal constituting said substantially constant envelope output signal.

3. Mobile communication system according to claim 1, wherein said base station includes means for detecting, upon reception of said substantially constant envelope output signal, the time subslot within which said substantially constant envelope output signal was transmitted.

4. Mobile communication system according to claim 3, wherein said modulation means modulates said pre-access carrier wave during said time subslot period with a periodic bitstream for providing a modulated pre-access carder wave and then filters the modulated pre-access carrier wave so as to obtain a substantially pure sinusoidal signal constituting said substantially constant envelope output signal, and wherein said means for detecting said time subslot period also detects the frequency of said substantially pure sinusoidal signal.

5. Mobile communication system according to claim 1, wherein said time slot period includes at least one time subslot period for transmitting a linearly modulated signal with a non-constant envelope, and at least one time subslot period for transmitting said substantially constant envelope signal.

6. Mobile communication system according to claim 4, wherein said frequency corresponds to control information.

7. Mobile communication system according to claim 2, wherein said digital linear modulation means includes a digital linear modulator and a filter.

8. Mobile communication system according to claim 7, wherein said digital linear modulator is a multiple phase shift keying modulator.

9. Mobile communication system according to claim 8, wherein said differential multiple phase shift keying modulator is a $\pi/4$ shifted differential quadrature phase shift keying modulator.

10. Mobile communication system according to claim 7, wherein said filter is a Kaiser window filter.

11. Mobile communication system according to claim 1, wherein said system includes plural mobile subscriber stations arranged in groups to which distinct groups of time slot periods of said synchronized time division multiple access time structure are assigned, and that each of said mobile subscriber stations is able to launch said request for access in a time slot period of an assigned group only.

12. Mobil communication system according to claim 11 wherein said synchronized time division multiple access time structure is divided into successive time slot periods, said successive time slot periods being further divided into an integral number (n) of groups, each successive time slot period being assigned a group number between 1 and n, time slot periods having identical group numbers constituting said groups.

13. Mobile communication system with a base station and a plurality of mobile subscriber stations including modulation means for modulating a carrier wave with a request for access signal for providing a modulated carder wave, and transmission means for transmitting the modulated carrier wave to said base station during a time slot period of a synchronized time division multiple access time structure known at the base station and the mobile subscriber stations, wherein said mobile subscriber stations are arranged in groups to which distinct groups of time slot periods of said synchronized time division multiple access time structure are assigned, and that each of said mobile subscriber stations is able to launch said request for access in a time slot period of an assigned group only.

14. Method for requesting access from a mobile subscriber station to a base station, comprising the steps of:
  launching a request for access modulated on an access carrier wave from said mobile subscriber station to said base station within a time slot period of a synchronized time division multiple access time structure known at the base station and the mobile subscriber station, wherein said access carder wave is linearly modulated, and wherein, preceding the above mentioned step of launching, said method includes the step of:
  modulating a pre-access carrier wave in such a way that a substantially constant envelope output signal is obtained during a time subslot period of said time slot period.

15. Method for requesting access from at least one of a plurality of mobile subscriber stations to a base station, comprising the steps of:
  launching a request for access modulated on an access carrier wave from said mobile subscriber station to said base station within a time slot period of a synchronized time division multiple access time structure known at the base station and the mobil subscriber station, wherein said method includes the initial step of:
  arranging said mobile subscriber stations in groups, to which distinct groups of time slot periods of said synchronized time division multiple access time structure are assigned, and wherein each of said mobile subscriber stations is allowed to launch said request for access in a time slot period of an assigned group only.

* * * * *